United States Patent [19]

Palm

[11] Patent Number: 4,946,301
[45] Date of Patent: Aug. 7, 1990

[54] ADHESIVE STICK

[75] Inventor: Per-Arne Palm, Järfälla, Sweden

[73] Assignee: Casco Nobel AB, Stockholm, Sweden

[21] Appl. No.: 299,464

[22] Filed: Jan. 23, 1989

[30] Foreign Application Priority Data

Jul. 28, 1988 [SE] Sweden .................. 8800279

[51] Int. Cl.$^5$ .................. C08F 110/02; C08L 7/00
[52] U.S. Cl. .................. 401/49; 524/270; 524/284
[58] Field of Search .................. 524/270, 284, 131; 401/49

[56] References Cited

U.S. PATENT DOCUMENTS

| | | | |
|---|---|---|---|
| 2,870,105 | 1/1959 | Ridgway et al. | 524/270 |
| 3,576,776 | 7/1971 | Muszik et al. | |
| 3,846,363 | 11/1974 | Ando. | |
| 4,644,026 | 2/1987 | Shuman et al. | 524/270 |
| 4,716,189 | 12/1987 | Gollub et al. | 524/284 |

FOREIGN PATENT DOCUMENTS 0033656 12/1981 European Pat. Off.
0233685 8/1987 European Pat. Off.

*Primary Examiner*—Alan W. Cannon
*Attorney, Agent, or Firm*—Fred Philpitt

[57] ABSTRACT

An adhesive stick for application of adhesive to a substrate for temporary bonding to another substrate which stick contains binder, water and a shape-giving, gel-forming agent which is an alkali metal or ammonium salt of aliphatic carboxylic acid having from 8 to 36 carbon atoms. As binder in the adhesive stock a combination of an aqueous dispersion of a copolymer based on $C_2$–$C_{10}$ alkyl esters of acrylic acid and a water dispersible tackifying agent is used. The tackifying agent consists of modified tall oil rosin or modified gum rosin.

5 Claims, No Drawings

ADHESIVE STICK

The present invention relates to an adhesive stick for application of adhesive to a substrate. More particularly the invention relates to an adhesive, in the form of a stick, which adhesive gives a temporary bond which can be broken and formed anew a number of times.

Solid adhesives, in stick form, are known for bonding of, for example, paper and cardboard. The adhesive is usually intended to give a permanent bond, i.e. when one surface has been bonded to a receiving surface and the adhesive has dried the two surfaces cannot be separated without tearing the material into pieces. The adhesive sticks consist essentially of a film forming polymer, a gelling agent and solvent(s). Aqueous solutions or aqueous dispersions of polymers which give permanent bonds are used as film forming polymers, for example hydrolysed polyvinyl acetate, salts of polyacrylic acid, polyacrylamides, phenol resins and alkyd resins. A frequently used polymer is polyvinyl pyrrolidone.

As gel-forming, shape-giving, substance two different systems are used within the technique. One consists of alkali or ammonium salts of aliphatic carboxylic acids with 8 to 36 carbon atoms, for example sodium stearate, and the other consists of a reaction product of sorbitol and benzaldehyde.

Water and/or solvents miscible with water, most often lower mono- or polyhydric alcohols, are used as solvents. Examples of patents which describe the technique are U.S. Pat. No. 3576776 and DE No. 2204482.

It is known to use adhesives which allow a temporary bond on pre-printed and pre-coated paper substrates such as self-adhering note pads (Post-it ® from 3M). By a temporary bond should be understood that the adhesive coated surface can be adhered to a receiving surface and removed from this without leaving traces of adhesive on the receiving surface, and that this can be repeated a number of times. A paper substrate which has been pre-coated with adhesive has a limited field of utilization, although it in itself functions very well.

It is thus an object of the present invention to offer a pressure sensitive, self-adhering, removable and readhering adhesive in the form of a stick.

There are many demands on a pressure sensitive, self-adhering, readhering adhesive. It must have a correctly balanced tack so that the surface coated with adhesive adheres sufficiently to the receiving surface and at the same time it must not adhere permanently, but it should be possible to remove the adhesive coated surface from the receiving surface without damaging either of the surfaces and without leaving residues of the adhesive on the receiving surface. The tack of the adhesive must also allow the coated surface to adhere and be removed a number of times. The tack must also be controllable for a long time, i.e. the adhesive must not form a permanent bond after a longer period of time.

There is further a difficulty in applying the right amount of adhesive. Since the tack of the adhesive is proportional to the applied amount of adhesive it is important to get a controlled amount on the substrate to be glued. Too high an amount gives too strong a tack which can result in tearing of the adhesive coated substrate or the receiving surface. On the other hand, too small an amount can give insufficient contact between the surfaces. At the production of the above mentioned pre-coated paper substrates the self-adhering adhesive is applied in the form of solutions or dispersions by means of equipment which is used in printing processes. Such an equipment makes it possible to apply sufficiently thin layers to give a correctly balanced tack. Amounts in the range of from 8 to 10 g/m$^2$ are applied. However, it is not possible to apply such solutions or dispersions in such small amounts by manual methods with acceptable results. If too thick coatings are applied there will, in addition to the too strong tack, also be too high an amount of solvent on the surface and this leads to paper substrates with unevenly bent edges (so-called curling).

It has, however, been found that by producing the self-adhering adhesive in the form of a stick with a well balanced stiffness, it is possible to apply, in a simple manner, a controlled uniform amount of adhesive. It is thus possible to apply a correspondingly small amount as a uniform coating as when using the above mentioned equipment for printing processes Another advantage of the adhesive stick is that problems with clogging and cleaning of the application equipment are avoided.

For the production of an adhesive in stick form the binder is blended with some kind of gel-forming agent. The obtained stick should be stable and the adhesive should be easy to apply from the stick without deformation of this. It shall give a uniform coating, free from larger, thick accumulations in some spots.

There are thus several requirements which must be fulfilled at the same time for a satisfactorily functioning pressure sensitive, self-adhering adhesive in the form of a stick. A certain adhesive formulation can give a satisfactory result when it is applied in the form of a solution or a dispersion, for example at the above mentioned production of the self-adhering note pads. If the same adhesive formulation is transformed into a solid form it is not very likely that it will maintain its properties since the gel-forming agent will reduce the tack of the adhesive. It is not even certain that it is possible to convert the adhesive formulation to a solid form, since the dispersions which are usually used in these applications are heat sensitive and thus cannot withstand the heating to the temperatures which are necessary at the production of adhesive sticks.

It has now been found that an adhesive stick according to the claims in an excellent manner fulfills all the demands which have been set out above. The stick consists essentially of a combination of an aqueous dispersion of a copolymer based on $C_2$ to $C_{10}$ alkyl esters of acrylic acid and a water dispersible tackifying agent as binder, a gel-forming agent and water as the solvent.

In addition to the $C_2$ to $C_{10}$ alkyl esters of acrylic acid, the copolymer can also comprise acrylonitrile, acrylic acid, acrylamide, or derivatives thereof, or vinyl acetate. Examples of ester monomers which can be used are butyl acrylate, hexyl acrylate, ethylhexyl acrylate. Suitable copolymers are for example the aqueous dispersions which are sold under the trade mark Acronal DS 3348 or A 120 by BASF and the aqueous dispersion from Hoechst-Perstorp AB which has the designation Mowilith ® FD 146 S. One copolymer can be used as binder, but it is also possible to use a blend of two or more of the above mentioned copolymers.

As tackifiers, which can be dispersed in water, modified tall oil rosins and gum rosins are used, principally lower alcohol esters of the resins. As examples can be mentioned ethylene glycol ester of tall oil rosin and hydrogenated methyl ester of gum rosin. The tackifying agent can also be a mixture of two or more resin dispersions. It is also possible to use low molecular poly-a- methylstyrene, polybutene and similar types of hydrocarbon tackifying resins.

Lower alcohols can also be included in addition to water as the solvent.

The gelling agent is selected from alkali and ammonium salts, respectively, of aliphatic carboxylic acids having from 8 to 36 carbon atoms. A preferred substance is sodium stearate.

Known moisture retaining agents as well as surface active and antifoam agents can also advantageously be included in the adhesive stick formulations. Glycerol can for example be used as moisture retaining agent.

In addition to the above mentioned components the adhesive stick according to the invention can also contain conventional additives for adhesives, such as e.g. plasticisers, emulsifiers, pigments, colourants, fillers.

The different components are included in the adhesive stick in the following amounts: Acrylic acid ester-copolymer 15–50 per cent by weight, calculated as dry substance, preferably 25–35%. Tackifier 5–30 per cent by weight, calculated as dry substance, preferably 6–20%. Gelling agent 7–15 per cent by weight, preferably 10–11%. Water 15–60 per cent by weight, preferably 30–45%. When moisture retaining agents and antifoam agents are incorporated in the composition they are added in the following amounts: Moisture retaining agent 2–20 per cent by weight, preferably 4–7%. Antifoam agent 0.01–1.0 per cent by weight, preferably 0.1–0.7%.

Substrates coated with the adhesive stick according to the invention adhere excellently to almost any solid contact surface by gentle pressing of the substrate to the surface. Examples of surfaces to which the adhesive adheres are paper, cardboard, wood, plastic materials, porcelain, painted surfaces etc.

The adhesive stick of the invention is suitably prepared in such a manner that all components except the gelling agent are mixed. The gelling agent is then added under vigorous stirring and the stirring is continued slowly at a temperature of 60°–95° C., preferably 70°–85° C., until a homogenous mixture is obtained. The mixture is poured into suitable containers and allowed to cool to room temperature. When the mixture cools it gels and at room temperature it has become solid and has thereby taken the shape of the container. A suitable container is for example such a container as disclosed in the German patent 2327404.

The invention is further illustrated in the following examples, wherein, unless otherwise stated, parts and per cent relate to parts by weight and per cent by weight respectively.

| Example 1 | % |
|---|---|
| Acronal 3348 | 57.7 |
| Oulutac 30D | 26 |
| Glycerol | 5 |
| Nopco 8034 | 0.3 |
| Sodium stearate | 11.0 |
| | 100.0 |

All components except the sodium stearate were mixed in a vessel. The sodium stearate was then added under vigorous stirring and the mixture was heated on an oil bath (temperature=95° C.) under slow stirring for an hour and then for additionally 30 minutes without stirring. The temperature of the mixture was then 75° C. The mixture was then moulded in a suitable container. When the mass had cooled a stable stick which was easy to rub off was obtained, The tack was good and an adhesive coated paper adhered well to different substrates. The coated paper could be removed from the substrate and be readhered several times without leaving residues of adhesive.

| Example 2 | % |
|---|---|
| Acronal A 120 | 57.2 |
| Oulutac 30D | 27 |
| Glycerol | 5 |
| Nopco 8034 | 0.3 |
| Sodium stearate | 10.5 |
| | 100.0 |

The process of Example 1 was repeated. Also with this composition an adhesive stick with excellent properties was obtained.

| Example 3 | % |
|---|---|
| Mowilith FD 146 S | 11.0 |
| Acronal 3348 | 37.0 |
| Hercolyn D 55 W | 18.4 |
| Oulutac 30 D | 18.5 |
| Glycerol | 5.0 |
| Nopco 8034 | 0.1 |
| Sodium stearate | 10.0 |
| | 100.0 |

The process of Example 1 was repeated. An adhesive stick with good properties was obtained. Acronal®3348 is a 50% aqueous dispersion of an acrylic acid ester-copolymer based on n-butyl acrylate, 2-ethylhexyl acrylate and acrylonitrile and is produced by BASF. Acronal®A120 is a 50% aqueous dispersion of acrylic acid ester-copolymer based on n-butyl acrylate, 2-ethylhexyl acrylate and acrylonitrile and is produced by BASF. Mowilith®FD 146 S is a 66% aqueous dispersion of a copolymer of vinyl acetate and acrylic acid ester and is produced by Hoechst-Perstorp AB. Oulutac 30 D is a 50% aqueous dispersion of a modified tall oil rosin, produced by Vetsiluoto Oy, Finland. Hercolyn ® D 55 W is a 55% anionic aqueous dispersion of a hydrogenated methyl ester of rosin, produced by Hercules. Nopco ® 8034 is an antifoam agent containing silica, mineral oil and a methacrylate copolymer, produced by Henkel-Nopco A/S, Norway.

I claim:

1. An adhesive stick for the application of adhesive on a substrate for temporary bonding to another substrate, which stick contains a binder, water and, as a shape-giving gel-forming agent, an alkali metal or ammonium salt of an aliphatic carboxylic acid having from 8 to 36 carbon atoms, said binder being a combination of an aqueous dispersion of a copolymer based on $C_2$–$C_{10}$ alkyl esters of acrylic acid and, as a water-dispersible tackifier, a modified tall oil rosin or a modified gum rosin, said components being present in the following amounts based on the total weight of the stick: copolymer 15–50 percent by weight, calculated as dry substance; tackifier 5–30 percent by weight, calculated as dry substance; gel-forming agent 7–15 percent by weight; and water 15–60 percent by weight.

2. An adhesive stick according to claim 1 wherein the copolymer in addition to $C_2$–$C_{10}$ alkyl esters of acrylic acid, contains acrylonitrile or vinyl acetate as a comonomer.

3. An adhesive stick according to claim 1 wherein a mixture of two or more copolymers based on $C_2$-$C_{10}$ alkyl esters of acrylic acid is used.

4. An adhesive stick according to claim 1 wherein the copolymer is also based on butyl acrylate and/or ethylhexyl acrylate.

5. An adhesive stick according to claim 1 which also contains 2-20 percent by weight of a moisture retaining agent and 0.01-1.0 percent by weight of an antifoam agent.

* * * * *